(12) United States Patent
Bacic et al.

(10) Patent No.: US 7,084,784 B2
(45) Date of Patent: Aug. 1, 2006

(54) MEANS OF MOUNTING A TOLL CALCULATOR IN A MOTOR VEHICLE

(75) Inventors: Helmut Bacic, Koenigsfeld (DE); Klaus D. Hanke, Villingen-Schwenningen (DE); Ulrich Kraus, Villingen-Schwenningen (DE); Josef Wangler, Villingen-Schwenningen (DE); Robert Weber, Brigachtal (DE)

(73) Assignee: Siemens AG, München (DE)

( * ) Notice: Subject to any disclaimer, the term of this patent is extended or adjusted under 35 U.S.C. 154(b) by 86 days.

(21) Appl. No.: 10/871,904

(22) Filed: Jun. 21, 2004

(65) Prior Publication Data

US 2005/0001740 A1    Jan. 6, 2005

(30) Foreign Application Priority Data

Jul. 1, 2003    (DE) .................................. 103 29 784

(51) Int. Cl.
*G08G 1/00* (2006.01)

(52) U.S. Cl. ................. 340/928; 340/905; 340/426.16; 224/277

(58) Field of Classification Search ................ 340/928, 340/916, 426.16, 815.4, 905, 438; 359/838, 359/876; 248/205.8, 206.5, 298.1, 309.4; 224/227; 108/45

See application file for complete search history.

(56) References Cited

U.S. PATENT DOCUMENTS

| 5,485,944 | A | * | 1/1996 | Kauffman | 224/277 |
|---|---|---|---|---|---|
| 5,779,205 | A | * | 7/1998 | Ching | 248/205.8 |
| 6,095,060 | A | * | 8/2000 | Ma | 108/45 |
| 6,305,656 | B1 | * | 10/2001 | Wemyss | 248/309.4 |
| 6,824,281 | B1 | * | 11/2004 | Schofield et al. | 359/876 |
| 6,888,940 | B1 | * | 5/2005 | Deppen | 379/446 |

FOREIGN PATENT DOCUMENTS

| DE | 19734749 A1 | 3/1999 |
|---|---|---|
| DE | 10138326 A1 | 1/2003 |

OTHER PUBLICATIONS

Derwent Abstract—DE-19734749A1; Mar. 4, 1999; Reitter & Schefenacker GmbH & Co.KG, D-73730 Esslingen.
Derwent Abstract—DE-10138326A1; Jan. 30, 2003; Karl Mark, D-53424 Remagen.

* cited by examiner

*Primary Examiner*—Van T. Trieu
(74) *Attorney, Agent, or Firm*—Siemens AG

(57) ABSTRACT

It is proposed to assign a mounting arm to a toll calculator which is embodied as a surface-mounted device and which is connected in an articulated fashion to the toll calculator and can be mounted on the windshield of the motor vehicle. The toll calculator itself then rests with a relatively small area on the dashboard of the motor vehicle with the intermediate connection of a preferably elastomer supporting element which is preferably coated with adhesive on two sides.

16 Claims, 3 Drawing Sheets

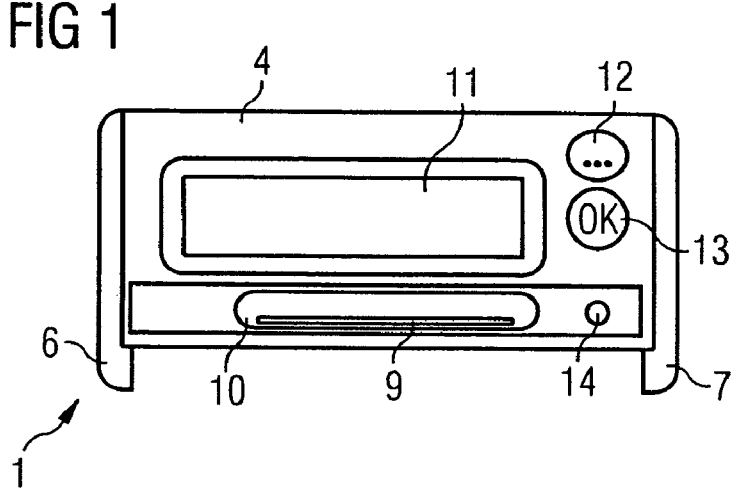
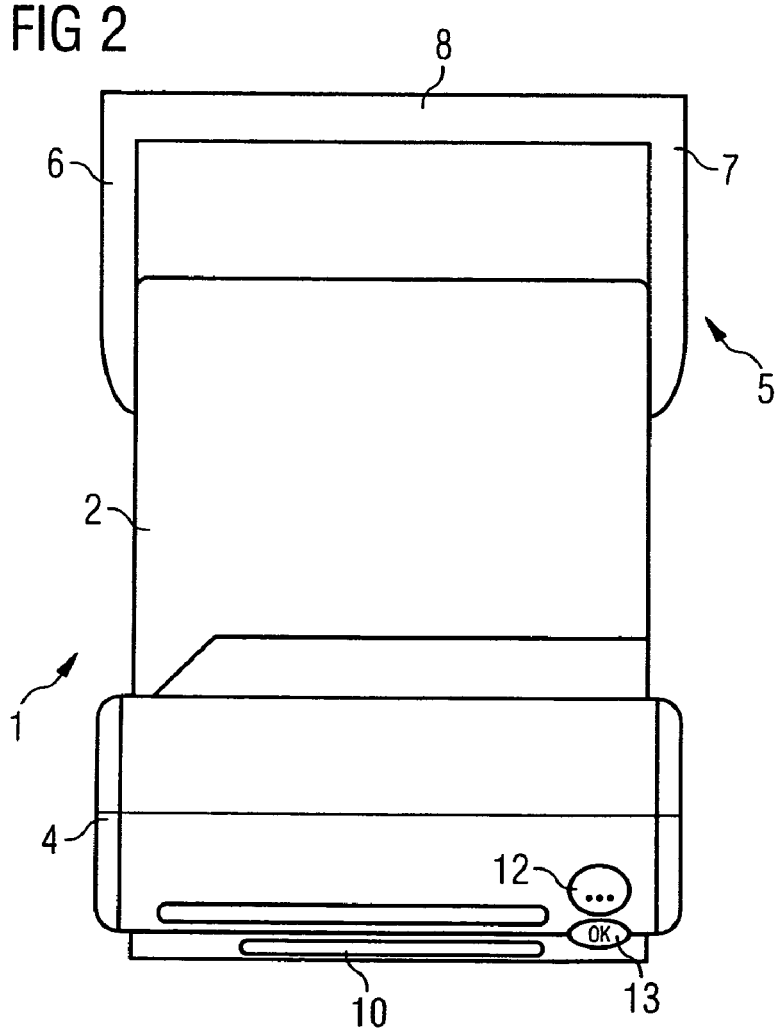

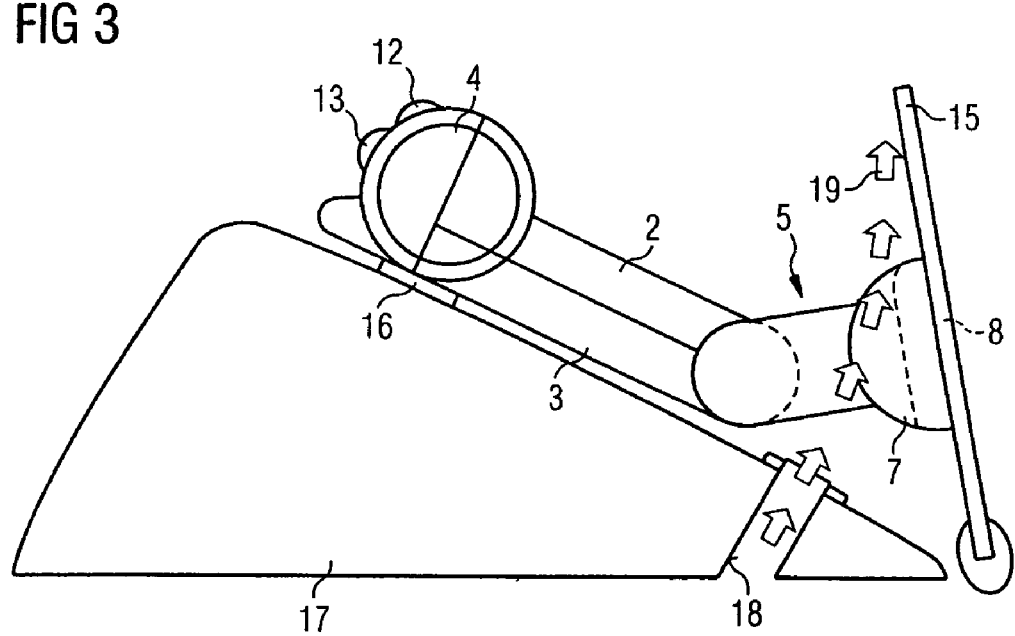

MEANS OF MOUNTING A TOLL CALCULATOR IN A MOTOR VEHICLE

BACKGROUND OF THE INVENTION

The invention relates to the means of mounting a toll calculator in a motor vehicle, the toll calculator being equipped at least with a display and being arranged on the dashboard of the motor vehicle.

Devices which are not designed as built-in devices, or cannot be designed as built-in devices, because they are not generally provided for their purpose of use, for example in motor vehicles, or have to be retrofitted owing to new legal requirements but on the other hand are to be arranged in the direct field of view and within reach of the driver, can be positioned, if appropriate, directly on the windscreen or, when they have relatively large dimensions and are relatively heavy, have to be positioned on the upper side of the dashboard of the respective motor vehicle which is assigned to the windshield. This is the situation with toll calculators which are known to be used for calculating charges (tolls) for using roads.

Such a toll calculation is based on identifying a route, during which process a comparison between the toll-incurring road sections which are stored in the toll calculator and the respective fixed toll charges is made after each determination of a position, which is determined, for example on a second-by-second basis, by means of the GPS receiver which is arranged in the toll calculator. If a toll is calculated using user data and vehicle data, it is debited from the toll credit of the user and proof of authorization to use the respective road section is produced. Here, a chipcard which is introduced into the toll calculator can be used as the credit carrier and/or there may be provision for the respective tolls and other data to be transferred, preferably via a mobile telephone network, to a central system which, for its part, updates the data which is necessary for the charging of tolls. The proof of authorization which is produced can be checked automatically, that is to say while traveling, when the respective motor vehicle passes a beacon which, for this purpose, is generally permanently arranged above or to the side of the roadway on the respective section of road, or is possibly also installed on a vehicle. In this context, the communication between a beacon and the toll calculator takes place in accordance with the interrogation method provided, for example using a suitable microwave link or infrared link, a corresponding transceiver module being either mounted directly on the windshield of the respective vehicle or being assigned to the toll calculator so as to be capable of pivoting in a suitable way and thus oriented in an interrogation direction.

In order, as indicated at the beginning, to mount the toll calculator on a dashboard, it has already been proposed to provide a carrier which, in order, for example, to permit toll credit and status information to be read satisfactorily on the display of the toll calculator, permits the toll calculator which can be connected to the carrier to be pivoted to a certain degree, but which carrier on the other hand also makes it possible to avoid visually unattractive clips or rails which would have to be formed on the housing of the toll calculator for direct mounting of the toll calculator on a dashboard. Owing to the considerable differences in the topography of the dashboards from one type of vehicle to another, preferably three adjustable mounting elements are assigned to the carrier itself, which elements are connected to the respective dashboard by bonding.

Irrespective of the fact that certain dashboards do not provide the necessary area for a toll calculator to be mounted in this way because they drop away steeply in the direction of the dashboard, that is to say have a rib-shaped cross section, and subsequent mounting operations can basically be performed only under difficult conditions, the toll calculator must be mounted with the utmost care in order to avoid damage to the surface of a dashboard, for example by adhesive residues, with the result that a high degree of mounting complexity has to be accepted. On the other hand, a toll calculator is to be constructed and mounted in such a way that the field of vision of the driver is adversely affected as little as possible and the device and its means of mounting also satisfy aesthetic requirements.

SUMMARY OF THE INVENTION

An object of the present invention has therefore been to provide measures for mounting a toll calculator on a dashboard which considerably reduce the known mounting complexity and improve the acceptance of a toll calculator as a surface-mounted device.

The means of achieving the object provide for a mounting arm which can pivot about an axis to be assigned to the toll calculator, for the free end of the mounting arm to be embodied in such a way that it can be mounted on the windshield of the vehicle, and for the toll calculator to be supported on the dashboard.

A preferred exemplary embodiment of the invention is characterized in that the mounting arm is embodied in the form of a bridge, and in that a web which connects the bearing limbs of the mounting arm is provided for mounting the toll calculator on the windscreen of the vehicle.

Further advantageous developments of the invention emerge from the subclaims which are not cited and from the following description.

The solution according to the invention provides, in particular, the advantage that the toll calculator can be mounted without using an additional carrier. This means that with the solution which is found the expenditure on components can be reduced considerably and the toll calculator can be arranged in a way which takes less installation space and is thus attractive, a flat design of the housing of the toll calculator in the viewing direction of the driver preventing the field of vision of the driver from being adversely affected by the toll calculator. It is essential that the actual mounting of the toll calculator is carried out by means of a combination of two mounting or securing measures. Here, the loading of the mounting location on the windshield, caused by travel-dependent moments, is reduced considerably by the fact that the toll calculator is supported on and stuck to the dashboard, as well as by the articulated connection between the mounting location on the windshield and the toll calculator. In other words, the toll calculator is secured to the windshield by means of the mounting arm, but its weight is borne by the dashboard. It is expedient here if the toll calculator is supported in the region of its center of gravity. The, as it were, punctiform or linear support of the toll calculator on a dashboard and the, within certain limits, free selection of the attachment location of the mounting arm on the windshield also provides a possible way of selecting the position of the display of the toll calculator.

The axis about which the mounting arm is designed to pivot expediently runs approximately in parallel with the display plane of the display or with the plane of the windshield of the motor vehicle. For this reason, this arrangement is particularly favorable because in this way the mounting means can be adapted to any of the typical installation situations, in particular with regard to the different angles between the windshield and the dashboard.

For maximum flexibility when the toll calculator according to the invention is installed, it is expedient if the toll calculator is supported with an area on the dashboard which is smaller than the area of the normal projection of the toll calculator onto the dashboard. The supporting area is here preferably between 5% and 30% of the area of the normal projection of the toll calculator onto the dashboard. This embodiment has, on the one hand, the advantage that the toll calculator can be removed again, very largely free of residue, when there has been a previously materially joined connection formed between the toll calculator and the dashboard, and on the other hand the invention makes the means of mounting the toll calculator independent of the topography of the dashboard whose surface is generally curved and shaped to a greater or lesser degree. The essential factor here is that the toll calculator is supported on a small surface on the dashboard of the vehicle.

In order, in this context, to attenuate or avoid the effects, in particular of vertical acceleration due to travel, on the toll calculator which is positioned on the dashboard, a suitable, that is to say topography-compatible, disk-shaped or strip-shaped supporting element can advantageously be provided between the toll calculator and the dashboard, which supporting element can be manufactured, for example, from a foamed material and coated with adhesive on both sides. It is also possible to provide touch-and-close fastening means which can be operatively connected to one another. It is also conceivable to form the supporting element directly on the housing of the toll calculator, that is to say to form it integrally by means of injection molding technology from an elastomer material, preferably with an adhesive, but at least nonslip finish. It is also conceivable, that is to say, the surface of a dashboard is suitable for suction adhesion, to provide at least one suction cup as the supporting element and to fasten it in a suitable way to the housing of the toll calculator. If the mounting arm is provided by means of suitable rails which are mounted on the windshield, the toll calculator can easily be detachably mounted and thus used optionally.

The bearing of the mounting arm, which is preferably formed in a bridge shape for stability reasons, is expediently configured in such a way that it is possible to mount the mounting arm at the installation location and thus in accordance with the conditions at the installation location, that is to say a mounting arm which is longer or shorter, and possibly also bent, can be selected for the position of the toll calculator or its display in accordance with the depth and cross-sectional shape of a dashboard and the inclination of the windshield. Of course, the mounting arm can also be embodied with one arm. Wide and thus tilt-free bearing on the housing of the toll calculator is essential. In particular in the case of a bridge-shaped construction of the mounting arm it is conceivable to connect the web of the mounting arm to the bearing limbs in an articulated fashion, which can provide an even greater degree of adaptability. Furthermore, the web of the mounting arm can advantageously be embodied as a carrier of a transceiver module for communication with, for example, fixed beacons. It is also to be noted that the bearing limbs of a bridge-shaped mounting arm can be made relatively narrow so that the ventilation of the windshield is prevented from being influenced by the mounting of the toll calculator.

BRIEF DESCRIPTION OF THE SEVERAL VIEWS OF THE DRAWINGS

The invention will be explained in more detail below with reference to two exemplary embodiments of toll calculators which are illustrated in simplified form, and an installation sketch, in which:

FIG. 1 shows a front view of a first exemplary embodiment of a toll calculator,

FIG. 2 shows a plan view of the toll calculator according to FIG. 1,

FIG. 3 shows an installation sketch with a side view of the toll calculator according to FIGS. 2 and 3 in an assignment to a schematically illustrated dashboard, as well as a windshield of a motor vehicle.

DETAILED DESCRIPTION OF THE INVENTION

Figure 4:
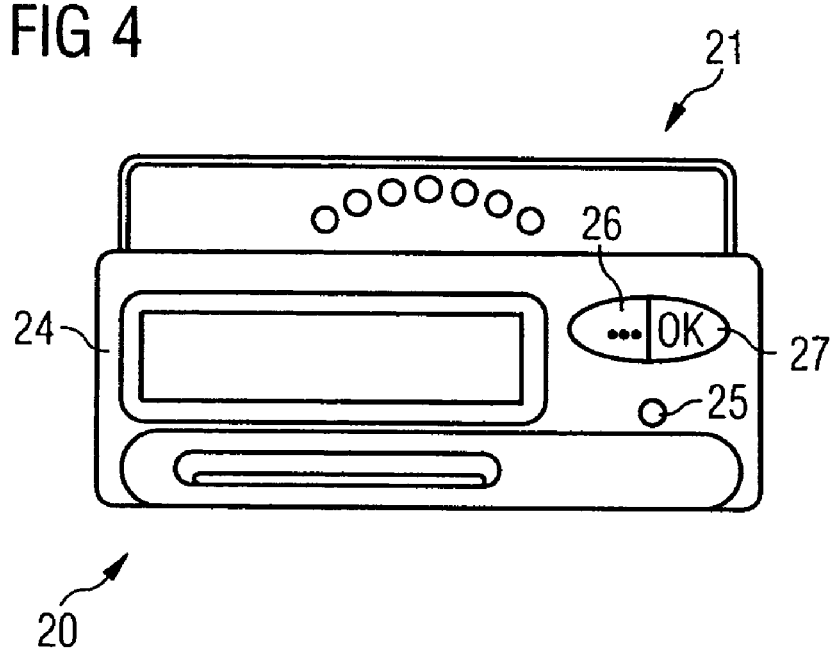
FIG. 4 shows a front view of a second exemplary embodiment of a toll calculator and FIG. 5 shows a side view of the toll calculator according to FIG. 4.

As is apparent from FIGS. 1, 2 and 3, the housing of the toll calculator 1 illustrated is combined essentially from three housing components, specifically a cover part 2, a bottom part 3 and a front panel 4. A bridge-shaped mounting arm 5, whose bearing limbs are designated by 6 and 7 and whose web which connects the bearing limbs 6, 7 is designated by 8, is pivotably connected to the toll calculator 1, the pivoting axis of the mounting arm 5 lying essentially in a plane which is parallel to the display plane of the display, and extending at right angles to the vertical axis of the toll calculator 1. The toll calculator 1 which is embodied as flat as possible because of the field of vision, but also for aesthetic reasons, contains essentially a printed circuit board which is assigned to the various electronic functional modules, a display module which is placed in contact with the printed circuit board, and a chipcard holding assembly. Assigned to the latter, on the front panel 4, are a plug-in opening 9 and a gripping recess designated by 10. 11 designates the cover glass of the display whose displays can be selected and moved forward by means of pushbutton keys 12 and 13. A lighting element 14, which is also arranged on the front panel 4, has the purpose of indicating the standby state of the toll calculator 1.

The installation sketch, FIG. 3, shows the arrangement of the toll calculator 1 in a motor vehicle, the mounting arm 5 which is pivotably connected to the toll calculator 1, or the web 8 of the mounting arm 5, being mounted directly on the windshield 15 by bonding, and the toll calculator 1 resting on the dashboard 17 of the respective motor vehicle with the intermediate positioning of a disk-shaped or strip-shaped supporting element 16. When the mounting arm 5 is bonded to the windshield, the bonding technique which is customary with rearview mirrors and can generally be satisfactorily reproduced is applied. The supporting element 16 is preferably composed of a foamed material which is coated on two sides with adhesive so that the toll calculator 1 not only rests on the dashboard but is also bonded to it in a way in which damps forces which are typical of driving. Instead of a supporting element 16 made of an adhesive-coated foamed material it is also possible, for example, to use a carrierless adhesive body made of an acrylic polymer. If the communication relating to the use authorization is carried out via, for example, a microwave link or infrared link, the web 8 can be embodied as a housing which has the purpose of holding the corresponding transceiver module. In this case, the necessary signaling and supply lines can be laid, protected against access, in one of the bearing limbs 6, 7. It is also to be noted that the bridge-shaped embodiment of the mounting arm 5 permits the toll calculator 1 to be mounted in a stable way which is virtually free of play using relatively narrow bearing limbs 6, 7. The latter is significant inasmuch as the airstream 19 which emerges through the nozzles 18 in the dashboard 17 in order to defrost and dry the windshield 15 is not impeded in its effect.

Figure 5:
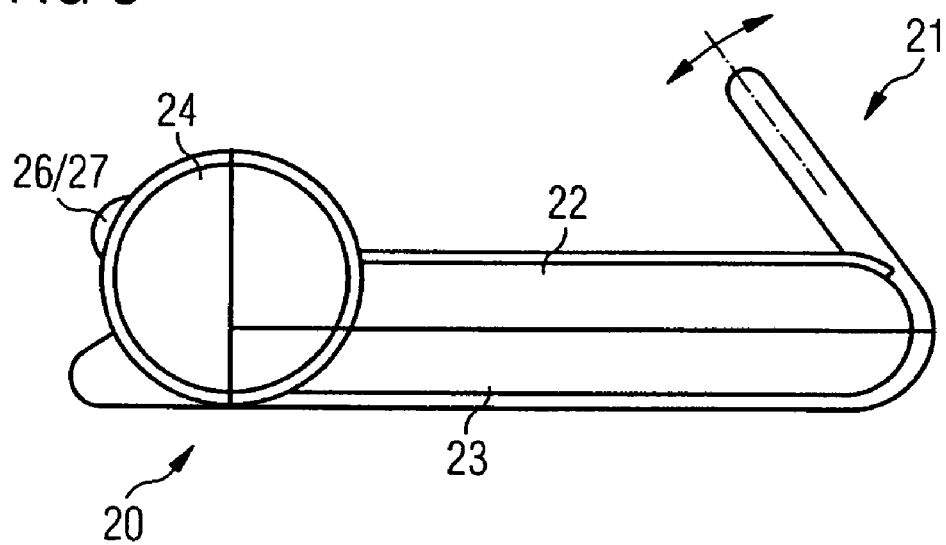

A mounting arm 21, which is of essentially plate-shaped design, is assigned to the toll calculator 20 which is illustrated in FIGS. 4 and 5 and is largely identical to the toll calculator 1 described above, the plate-shaped mounting arm 21 being arranged in a radial plane with respect to its pivoting axis. In addition, the mounting arm 21 can be embodied as a housing which holds a transceiver module for microwave communication. For the sake of completeness it is to be noted that the toll calculator 20 is also composed of a cover part 22, a bottom part 23 and a front panel 24 and is equipped with a display module and a chipcard holding assembly. In an analogous fashion to the toll calculator 1, 25 refers to a lighting element for displaying the standby state. Pushbutton keys corresponding to the pushbutton keys 12 and 13 are designated by 26 and 27 and are used for inputting, for example, identifications or for calling position information or debited amounts of money or remaining amounts of money. In contrast to the exemplary embodiment according to FIGS. 1, 2 and 3, in the exemplary embodiment according to FIGS. 4 and 5 the mounting arm 21 is mounted within the contours of the cover part 22 and bottom part 23 of the toll calculator 20, that is to say the cover part 22 and bottom part 23 are configured in such a way that bearing limbs, to which axial projections which are integrally formed on the mounting arm 21 are assigned and which carry bearings, are produced when the two housing components are assembled.

The toll calculator 20 is mounted in the same way as the toll calculator 1, that is to say, on the one hand, by adhesion to the dashboard, and on the other hand by means of an adhesive connection of the mounting arm 21 to the windshield of the respective vehicle. Here, depending on the curvature of the windshield, the mounting arm 21 can be mounted over a relatively large area or, using suitable spacing elements, mounted in a linear or punctiform fashion at at least two locations, it being possible to use the carrierless adhesive films or adhesive bodies which have already been mentioned.

We claim:

1. A means of mounting a toll calculator in a motor vehicle, the toll calculator being equipped at least with a display and being arranged on the dashboard of the motor vehicle, the motor vehicle including a windshield, comprising: a mounting arm which can pivot about an axis and which is assigned to the toll calculator in that a free end of the mounting arm is embodied in such a way that it can be mounted on the windshield, and in that the toll calculator is supported on the dashboard.

2. The means of mounting a toll calculator according to claim 1, wherein the axis about which the mounting arm is designed to pivot runs approximately parallel to a display plane of the display.

3. The means of mounting a toll calculator according to claim 1, wherein the toll calculator is supported with an area on the dashboard which is smaller than an area of normal projection of the toll calculator onto the dashboard.

4. The means of mounting a toll calculator according to claim 1, wherein the toll calculator is supported on an essentially small surface on the dashboard.

5. The means of mounting a toll calculator according to claim 1, further comprising a disk-shaped supporting element provided between a bottom part of a housing of the toll calculator and the dashboard.

6. The means of mounting a toll calculator according to claim 1, wherein the supporting element is coated with adhesive on two sides.

7. The means of mounting a toll calculator according to claim 1, wherein the supporting element is manufactured from an elastic material.

8. The means of mounting a toll calculator according to claim 1, further comprising an elastomer foot arranged on a bottom part of the toll calculator.

9. The means of mounting a toll calculator according to claim 1, further comprising a touch-and-close fastening means arranged between a bottom part of the toll calculator and the dashboard.

10. The means of mounting a toll calculator according to claim 1, wherein the toll calculator is positioned on the dashboard such that an essentially center of gravity of the toll calculator is supported.

11. The means of mounting a toll calculator according to claim 1, wherein the mounting arm is embodied in a bridge form, and in that a web are ranged to connect bearing limbs of a bridge-shaped mounting arm is equipped for mounting the toll calculator on the windshield of the vehicle.

12. The means of mounting a toll calculator according to claim 11, wherein the web is pivotably connected to bearing limbs of the mounting arm.

13. The means of mounting a toll calculator according to claim 11, wherein the web is embodied such that it can be mounted directly on the windshield of the vehicle by bonding.

14. The means of mounting a toll calculator according to claim 11, wherein the web is embodied such that it can be introduced into rails which are mounted on the windshield of the vehicle, and can be connected to the rails.

15. The means of mounting a toll calculator according to claim 11, wherein the web is embodied as a housing for a transceiver module which communicates with essentially fixed beacons through the windshield of the vehicle.

16. The means of mounting a toll calculator according to claim 11, wherein the bearing limbs are spaced so as to facilitate air flow therebetween.

* * * * *